June 8, 1965   H. R. NYCHKA   3,188,175
PROCESS FOR PRODUCING SULFAMIC ACID
Filed June 1, 1962
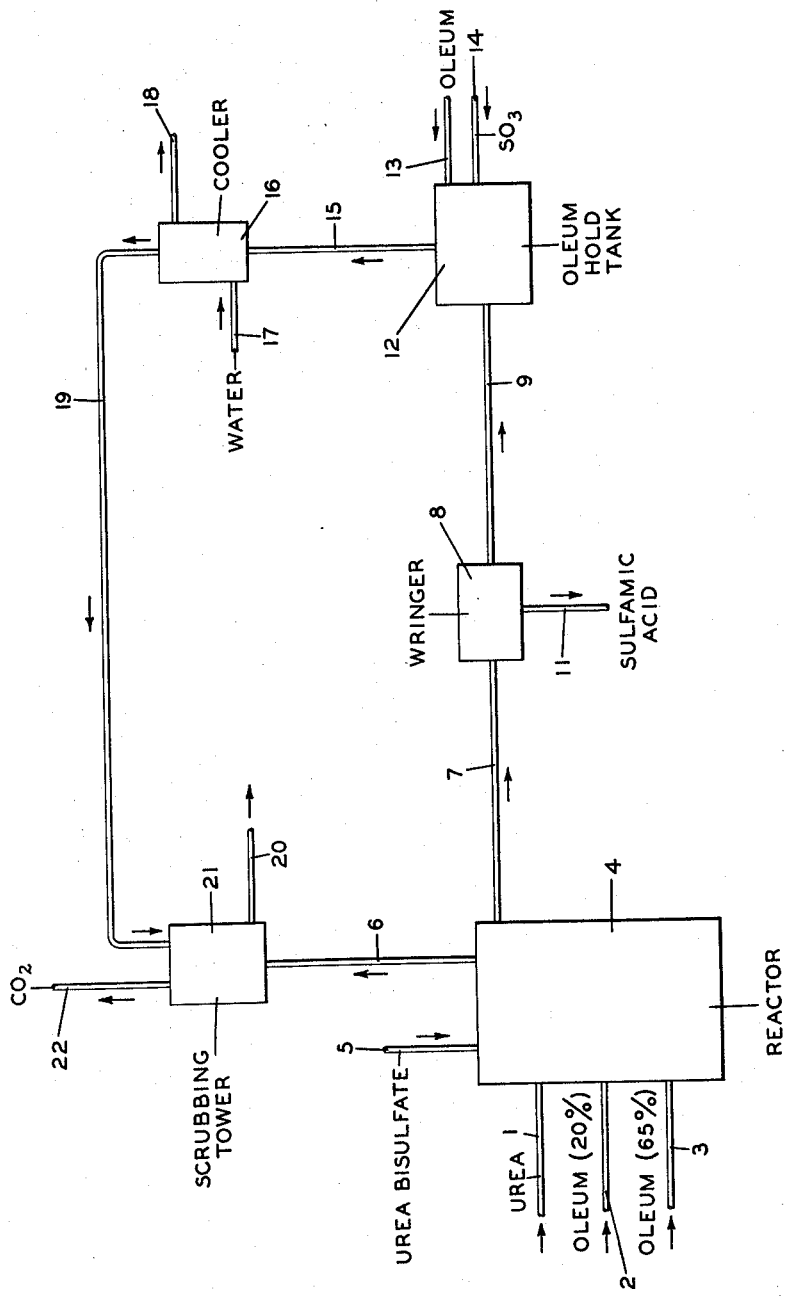
INVENTOR
HENRY R. NYCHKA
BY
Alvin Engelstein
ATTORNEY 3,188,175
PROCESS FOR PRODUCING SULFAMIC ACID
Henry R. Nychka, Randolph Township, Morris County, N.J., assignor to Allied Chemical Corporation, New York, N.Y., a corporation of New York
Filed June 1, 1962, Ser. No. 199,438
4 Claims. (Cl. 23—166)

This invention relates to the manufacture of sulfamic acid and more particularly to a new and improved process for producing sulfamic acid by reacting urea, sulfur trioxide and sulfuric acid.

Although the recation of sulfuric acid, sulfur trioxide and urea was known—U.S. patent, Baumgarten, 2,102,-350, Ber. 69B, 1929–37—from a practical commercial operation many problems were encountered due to the inherent nature of the reaction which is strongly exothermic and normally proceeds with considerable violence. In addition the resultant product, sulfamic acid is a relatively high melting point chemical, 250° C., and consequently presents a serious problem with respect to processing and separation of the sulfamic acid from the reaction products as well as heat transfer. Various methods have been proposed to overcome these processing problems with indifferent success. In one suggestion it has been proposed to premix the reagents at a temperature below that required for the formation of sulfamic acid followed by heating to the higher temperature necessary for it to occur. According to this procedure, the exothermic effect of the reaction is minimized, however, new problems are created since this two-step process requires costly apparatus, is time consuming and also employs brine cooling, an expensive procedure, to keep the temperature within the required low range of the initial premix. Moreover, the final product sulfamic acid is most difficult to separate from the final sulfamic acid oleum sludge which is produced. Another suggestion was to use a large excess of sulfur trioxide as a reaction medium. The use of sulfur trioxide as the reaction medium for the production of sulfamic acid unfortunately was not satisfactory since it was found difficult to control the reaction and also considerable difficulty was experienced in removing residual sulful trioxide from the sulfamic acid product which formed. Furthermore, the use of a large excess of sulfur trioxide as a reaction medium necessitates pressure equipment in the desired temperaure range for forming sulfamic acid thereby appreciably increasing the cost of capital investment.

An object of the present invention is to provide an efficient economical process for producing sulfamic acid by reacting urea, sulfur trioxide and sulfuric acid. Another object is to obtain a good control of the reaction of urea, sulfur trioxide and sulfuric acid and to permit easy separation of sulfamic acid from the reaction mixture. A further object is to eliminate the need for the two-step procedure of the prior art i.e., premixing the reagents at a low temperature to inhibit sulfamic acid formation followed by heating at higher temperatures necessary for it to occur. Other objects and advantages will be apparent from the following description and accompanying drawing.

In consideration of a good commercial practical process for producing sulfamic acid several factors must be taken into account. For good economical operation the process should not be time consuming and desirably should be conducted at substantially atmospheric pressure to avoid use of pressure equipment. In addition, the product sulfamic acid should be formed in a reaction medium which may be conveniently adapted to provide a cooling effect for the exothermic nature of the reaction which takes place and from which the sulfamic acid can easily be separated and purified if desired.

In the course of my experimentation for production of sulfamic acid, I tried conducting the reaction at a temperature conducive to the formation of sulfamic acid throughout but found however, that the exothermic nature of the reaction produced hazardous operating conditions. However, when the reaction was conducted in the presence of a large excess amount of oleum, I discovered quite unexpectedly that the process could be conducted at temperatures throughout within the sulfamic acid forming range, the moreover, the excess oleum reaction medium could be advantageously employed to regulate the temperatures such that the reaction proceeds smoothly and without dangerous operating conditions. Furthermore, I found that the formed product could be easily and conveniently separated from the excess oleum medium by a simple centrifuge procedure.

In accordance with the present invention sulfamic acid may be prepared in an efficient and economical manner by mixing urea or urea bisulfate in molten form with oleum of 45±1% concentration in an amount of 100–400%, preferably 200–300% in excess of the stoichiometric amount required for reaction with urea, maintaining the temperature of reaction within the range of 60–90° C., preferably 65–85° C. under substantially atmospheric pressure, to form a slurry of sulfamic acid in the large excess oleum medium, withdrawing the sulfamic acid and excess oleum medium from the reaction zone, separating the sulfamic acid from the excess oleum medium and thereafter cooling and recycling the excess oleum to the reaction zone. By effecting interaction of urea or urea bisulfate with oleum of 45±1% concentration in an amount of 100–400% in excess of the stoichiometric amount required to react with urea, effective control of the reaction is obtained and moreover, the sulfamic acid which forms as a slurry in the excess oleum reaction medium can be easily separated by any suitable procedure such as by centrifuge. The excess oleum solvent separated from the sulfamic acid can then be brought to the required quantity and strength by the addition of fresh liquid sulfur trioxide or oleum, cooled, and introduced into a scrubbing tower where it is passed countercurrent to the evolved carbon dioxide and sulfur trioxide vapors leaving the reactor. The excess oleum serves to separate the sulfur trioxide from the carbon dioxide and the excess oleum and sulfur trioxide may thereafter be returned to the reaction zone for the next cycle.

In carrying out the process of the present invention, the reactants may be brought together in a variety of ways. In a preferred method, urea and oleum of 45% concentration may be introduced into a reaction vessel into which has been previously introduced about 45% oleum. In this procedure the urea preferably is fed to the reactor in solid form, i.e. pelleted, granulated or crystalline form and the sulfur trioxide and sulfuric acid are combined as oleum so that the urea and oleum are introduced simultaneously into the large excess of oleum solvent. The addition of the reactants should be accompanied by agitation so that the reactants are dispersed in the excess oleum solvent thereby preventing local accumulation of urea which if permitted to occur could create difficulties in controlling the reaction. Although the reaction proceeds satisfactorily at temperatures in the range of 60–90° C., preferred temperatures for optimum results are in the range of about 65–72° C. Alternatively, urea and concentrated sulfuric acid may be prereacted at a temperature of about 70–80° C. to form urea bisulfate, which may be added in molten form to excess oleum of 45% concentration in a reaction vessel wherein a temperature of 60–90° C. is maintained, preferably 80–85° C. Temperatures substantially in excess of 90° C. should be avoided since they are conducive to the formation of impurities such as ammonium bisulfate whereas temperatures substantially below 60° C. inhibit the formation of sulfamic acid and are therefore not desirable. Generally, at the initiation of the reaction, the quantity of oleum of 45% concentration should be in large stoichiometric excess over that required to react with urea and it is by this means that the reaction can be safely conducted in one-stage operation. I have found that this can be accomplished by reacting urea with 45% oleum concentration in an amount of 100–400% in excess of the stoichiometric amount required. When the amount of 45% oleum is substantially below 100% in excess of the stoichiometric amount required, the heat of reaction increases and seriously affects the yield of the product whereas an amount substantially in excess of 400% of the stoichiometric amount required produces no significant advantage. Optimum results are obtained according to the process when the amount of oleum of 45% concentration is in an amount of 200–300% in excess of the stoichiometric amount required for reaction with the urea.

The concentration of oleum should be such as to provide stoichiometric proportions of sulfur trioxide and sulfuric acid for reaction with urea. A 45±1% concentration of oleum contains sulfur trioxide and sulfuric acid in approximately stoichiometric proportions. Oleum in excess of 45% i.e. more than 45 parts by weight of free sulfur trioxide results in an excess of unreacted sulfur trioxide which contaminates the product and which creates difficulties in separation whereas oleum below 45±1% concentration will result in decreased reaction rates resulting in lower yields of sulfamic acid.

The accompanying drawing illustrates a method of carrying out the process of the present invention. Solid urea entering through line 1, oleum (20% concentration) entering through line 2 and oleum (65% concentration) entering through line 3 are introduced into reactor 4 to provide 100–400% more 45% oleum than stoichiometrically required, the rate of feed of 20% oleum and 65% oleum being adjusted to provide a feed of 45% oleum concentration to the reactor. Reactor 4 may be equipped with an agitator and provided with a jacket surrounding the reactor through which a cooling or heating medium flows. The conversion to sulfamic acid begins with the addition of the reactants to the large excess 45% oleum as evidenced by the evolution of carbon dioxide gas. The reaction temperature is generally maintained within the range of 60–90° C., preferably 65–72° C. and the pressure is substantially atmospheric. At the reaction temperature there is a continual evolution of carbon dioxide vapors together with small amounts of sulfur trioxide which are discharged from the reactor through line 6. The formed product, sulfamic acid, suspended as a solid in the large excess oleum diluent e.g. about 35% solid sulfamic acid suspended in oleum is discharged through line 7 and introduced into wringer 8 where the solid sulfamic acid product is separated from the mixture by centrifuge. Wringer 8 is a conventional centrifuge which serves to separate the mother liquor, excess oleum, from the sulfamic acid. In loading, the centrifuge is run at a low speed e.g. 1000 r.p.m. to allow even distribution of the solids. After the wringer is loaded, the revolutions per minute are increased up to about 3800 r.p.m. At this speed, the sulfamic acid is wrung dry. The mother liquor excess oleum discharges from wringer 8 through line 9 and passes into hold tank 12, where the excess oleum from the process is collected. At this point additional make-up oleum or liquid sulfur trioxide may be added through line 13 and 14 respectively in order to adjust the quantity and concentration of oleum. The excess oleum is then sent to external cooler 16 through line 15 where it is cooled by indirect heat exchange with a cooling medium such as water which enters external cooler 16 through line 17 discharging through line 18. The cooled excess oleum of 45% concentration leaves external cooler 16 through line 19 and enters scrubber tower 21 a liquid gas separator where the liquid excess oleum is passed countercurrent to the evolved carbon dioxide and sulfur trioxide vapors from the reactor 5. Substantially all the sulfur trioxide and oleum leaves scrubber tower 21 through line 20 where it is returned to reactor 4. Carbon dioxide vapors leave scrubber tower 21 through line 22.

In another embodiment, molten urea bisulfate (prepared by reacting urea and sulfuric acid at a temperature of about 70–80° C. in a reactor not shown) may be fed to reactor 4 through line 5. The temperature in the reactor is maintained at 78–85° C. At this temperature carbon dioxide gas is evolved and sulfamic acid formed as a slurry in the large excess oleum solvent. The slurry containing about 30% solids is then sent to wringer 8 where the sulfamic acid is separated from the excess oleum solvent. The separated excess oleum mother liquor is then sent to hold tank 12 where additional sulfur trioxide may be added to compensate for losses. After the concentration is brought up to about 45%, the excess oleum is returned to reactor 4.

According to the process, yields in excess of 90% based on urea are obtained. The product is of high quality and for most purposes a water washing yields a product of high purity. In those instances where further purification is desired, the product may be recrystallized from hot water in a manner conventional in the art.

The following examples further illustrate the invention. All parts are by weight.

*Example 1*

60 parts urea and 178 parts of 45% oleum was added to a reaction vessel containing about 356 parts of 45% oleum. The vessel was equipped with stirring and cooling means and the addition of the reactants was over a 10 minute period accompanied by agitation while maintaining the temperature between 65 and 70° C. Carbon dioxide was evolved steadily during addition showing that the reaction was occurring. Evolution continued to a minor degree and at a steadily decreasing rate for about 10 minutes after addition was completed. The product sulfamic acid steadily separated during addition and during the digestion period the reaction slurry, comprising about 35% solids suspended in excess oleum was easy to stir. It was then filtered easily and rapidly over a period of about 20 minutes. A yield of 90% of sulfamic acid based on the weight of urea was obtained.

*Example 2*

To 445 g. of 45% oleum, 155 g. (0.98 m.) of molten urea bisulfate was added in 15 minutes at 80–85° C. Slight cooling was applied to control temperature. During the urea bisulfate addition, and for 10 minutes longer, the carbon dioxide evolution continued. When it ceased, the reaction mixture was aged for 10 minutes more and then allowed to cool to about room temperature. The slurry containing 35% solids was filtered by means of a wringer type centrifuge (3600 r.p.m.) in 0.50–0.75 hour. The filtrate of 33% oleum strength was made up with sulfur trioxide (including losses) and 45% oleum. A yield of 91% of sulfamic acid based on the weight of urea was obtained.

Although certain preferred embodiments of the invention have been disclosed for purposes of illustration, it will be evident that various changes and modifications may be made therein without departing from the scope and spirit of the invention.

I claim:

1. A process for the production of sulfamic acid which comprises admixing urea and oleum of 45±1% concentration in an amount of 100–400% in excess of the stoichiometric amount required for reaction with urea, at a temperature within the sulfamic acid forming range of 60–90° C. under substantially atmospheric pressure to effect immediate initiation of reaction and substantial completion of reaction in one stage of said urea and oleum to produce sulfamic acid and by-product carbon dioxide, said sulfamic acid being formed as a slurry in the excess oleum medium, withdrawing the sulfamic acid and excess oleum medium from the reaction zone, separating the sulfamic acid from the excess oleum medium and thereafter cooling and recycling the excess oleum to the reaction zone for further reaction with urea.

2. A process for the production of sulfamic acid which comprises admixing urea bisulfate and oleum of 45±1% concentration in an amount of 100–400% in excess of the stoichiometric amount required for reaction with urea, at a temperature within the sulfamic acid forming range of 60–90° C. under substantially atmospheric pressure to effect immediate initiation of reaction and substantial completion of reaction in one stage of said urea bisulfate and oleum to product sulfamic acid and by-product carbon dioxide, said sulfamic acid being formed as a slurry in the excess oleum medium, withdrawing the sulfamic acid and excess oleum medium from the reaction zone, separating the sulfamic acid from the excess oleum medium and thereafter cooling and recycling the excess oleum to the reaction zone for further reaction with urea bisulfate.

3. A process for the production of sulfamic acid which comprises admixing urea and oleum of 45±1% concentration in an amount of 100–400% in excess of the stoichiometric amount required for reaction with urea, at a temperature within the sulfamic acid forming range of 65–72° C. under substantially atmospheric pressure to effect immediate initiation of reaction and substantial completion of reaction in one stage of said urea and oleum to produce sulfamic acid and by-product carbon dioxide, said sulfamic acid being formed as a slurry in the excess oleum medium, withdrawing the sulfamic acid and excess oleum medium from the reaction zone, separating the sulfamic acid from the excess oleum medium, cooling and passing the excess oleum countercurrent to evolved vapors of carbon dioxide and sulfur trioxide from the reaction zone to separate the sulfur trioxide vapors and returning said excess oleum and separated sulfur trioxide to the reaction zone for further reaction with urea.

4. A process for the production of sulfamic acid which comprises admixing urea bisulfate and oleum of 45±1% concentration in an amount of 100–400% in excess of the stoichiometric amount required for reaction with urea, at a temperature within the sulfamic acid forming range of 78–85° C. under substantially atmospheric pressure to effect immediate initiation of reaction and substantial completion of reaction in one stage of said urea bisulfate and oleum to produce sulfamic acid and by-product carbon dioxide, said sulfamic acid being formed as a slurry in the excess oleum medium, withdrawing the sulfamic acid and excess oleum medium from the reaction zone, separating the sulfamic acid from the excess oleum medium, cooling and passing the excess oleum countercurrent to evolved vapors of carbon dioxide and sulfur trioxide from the reaction zone to separate the sulfur trioxide vapors and returning said excess oleum and separated sulfur trioxide to the reaction zone for further reaction with urea bisulfate.

References Cited by the Examiner

UNITED STATES PATENTS

| | | | |
|---|---|---|---|
| 2,102,350 | 12/37 | Baumgarten | 23—166 |
| 2,191,754 | 2/40 | Cupery | 23—166 |
| 2,390,648 | 12/45 | Hill | 23—166 |
| 2,408,492 | 10/46 | Fauch | 23—166 |
| 2,436,658 | 2/48 | McQuaid | 23—166 |
| 3,051,551 | 8/62 | Ferlin et al. | 23—166 |

MAURICE A. BRINDISI, *Primary Examiner.*